Jan. 30, 1945.　　　C. H. KING　　　2,368,144
ROLLER
Filed Sept. 12, 1941
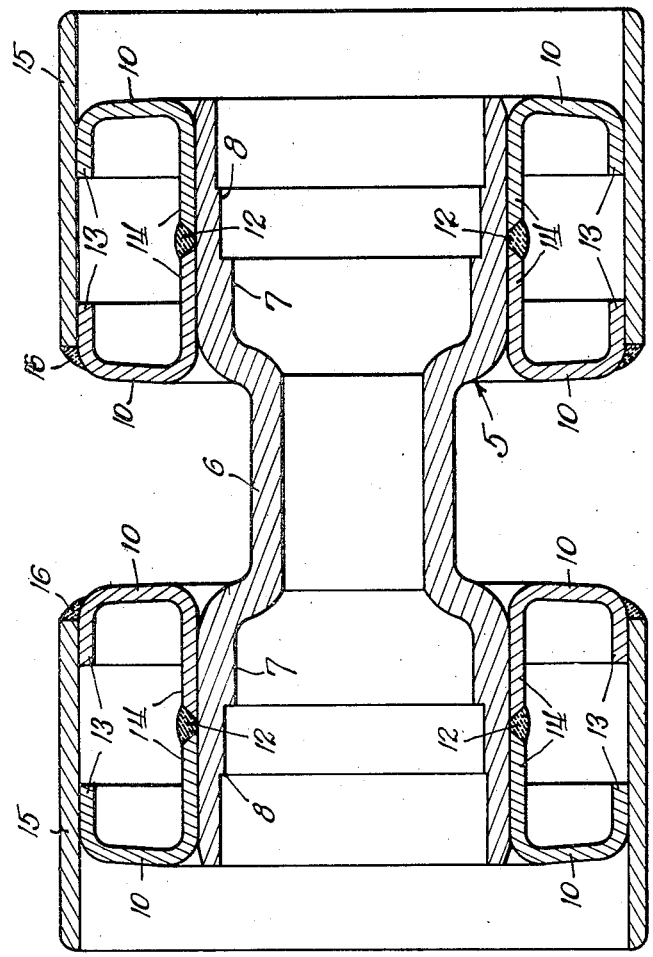
INVENTOR.
Charles H. King.
BY Walter E. Schirmer
Atty.

Patented Jan. 30, 1945

2,368,144

UNITED STATES PATENT OFFICE 2,368,144

ROLLER

Charles H. King, Buchanan, Mich., assignor to Clark Equipment Company, Buchanan, Mich., a corporation of Michigan Application September 12, 1941, Serial No. 410,501

4 Claims. (Cl. 74—230.8)

This invention relates to rollers, and more particularly is concerned with a roller construction used as a tread roller for treads on tractors, tanks and similar vehicles.

For supporting the tread intermediate its driving sprockets, it has been customary to provide a tread roller over which the tread can pass and be supported against looping intermediate its sprockets. This roller is mounted upon an idler shaft, and permits the tread to pass thereover, maintaining it in proper alignment and supporting it so that the driving sprockets will pick it up at the proper time.

The primary object of the present invention is to simplify the construction of the roller and to form it of fabricated parts which can be easily assembled to provide a roller of the desired shape and form without the necessity of making a heavy casting or performing a number of machining operations.

Other objects and advantages of the present invention will appear more fully from the following detailed description which, taken in conjunction with the accompanying drawing, will disclose to those skilled in the art the particular construction and operation of a preferred form of the present invention.

The single figure of the drawing indicates a vertical sectional view through a roller embodying the present invention.

Considering the drawing in detail, I have disclosed at 5 the hub or mounting portion of the roller, which consists of a central reduced portion 6 and expanded end portions 7 extending therefrom.

The sleeve 5 is formed from tubing of the desired wall thickness which has the intermediate portion thereof rolled or swaged down to a reduced diameter, as indicated at 6. The outer ends of the tubing are then bored to provide the bearing seats 8 for receiving the bearings by which the roller is supported on an idling shaft passing therethrough. Spaced equally on opposite sides of the reduced portion 6 of the roller are fabricated annular channel-like members 10 which are of substantially identical construction and which are pressed over the external annular surface of the end portion 7 of the sleeve into a position such as shown. They are then welded against possibility of axial or circumferential movement relative the sleeve 5 by means of the annular ring welds 12, which not only weld the two channels 10 to each other, but also weld the adjacent faces of the annular surface of the portions 7 of the sleeve. This secures the annular channels 10 in fixed position on the enlarged portion 7 of the sleeve, it being understood that this welding is done after the channels have been pressed into position.

It will be noted that the legs of the channel, indicated respectively at 13 and 14, are of unequal extent with the inner annular leg portions 14 being of increased length as compared to the leg portions 13. This allows a sufficient axial space between the leg portions 13 of the associated pairs of channels 10 to permit the introduction of a welding electrode into the space therebetween and down into the adjacent beveled surfaces of the leg portions 14 to facilitate forming the annular ring weld 12.

Pressed over the annular surfaces of the leg portions 13 of each pair of channels 10 are the rim members 15 which are formed of tubing, and form the wear surfaces over which the tread of the track-laying type tractor or tank is trained. In addition to the press fit provided on the leg portions 14, the rims 15 are also welded in position by means of the annular welds 16, as shown. These welds are spaced in such position as to provide for entrance of the central depending portion of the tread between the adjacent faces of the inner channels 10, and if necessary, the welds can be slightly machined to provide a smooth entering surface for this purpose.

It is apparent that with this construction the sleeve 5 and the rim members 15 may be formed from conventional tubing which is available in commercial sizes. The channels 10 may be formed of structural plate metal or the like bent to shape and rolled into ring form. This insures that the roller can be made of relatively cheap material, and can be fabricated at little or no cost due to the lack of any extensive machine operations thereon.

I am aware that certain changes may be made in proportions and degree without in any way modifying the underlying principles of the present invention, and I therefore do not intend to be limited except as defined by the scope and spirit of the appended claims.

I claim:

1. In combination, in an idler roller for a track-laying vehicle, a tubular hub sleeve having radially enlarged ends provided with internal bearing seats for rotatably supporting the same upon a shaft, a pair of annular rings of channel section arranged in facing relation on each enlarged end, said rings having the outer annular flange of less length than the inner flange to provide access for welding the inner flanges of said rings to said enlarged ends, and a rim member pressed over the outer annular flanges of each pair of rings and welded to one of said flange members, said rim member being spaced apart axially to expose the intermediate portion of said sleeve.

2. In combination, in an idler roller for a track-laying type of vehicle, a tubular hub member having enlarged cylindrical end portions provided with internal bearing seats and a reduced intermediate portion, radially extending spacing means encircling said end portions and having their inner peripheries welded thereto, axially directed annular flanges on the outer peripheries of said spacing means, and tubular rim members pressed over said flanges and welded into position in axially spaced relation on opposite sides of said reduced portion.

3. An idler roller for a track-laying vehicle comprising a tubular hub sleeve, axially spaced pairs of facing channel-shaped rings secured over said sleeve, the outer annular flange of each ring being of less length than the inner flange to provide access for welding the inner flanges of the rings to the sleeve, and rim members pressed over the outer annular flanges of each pair of rings and welded to one ring, said rim members being spaced apart axially to expose the intermediate portion of said sleeve.

4. An idler roller for a track of a track-laying vehicle comprising a tubular hub, annular channel-shaped ring members pressed axially over opposite ends of said hub into axially spaced relation thereon and having inner cylindrical flange portions seated on the external surface of said hub, radial webs extending outwardly from the axially spaced inner ends of said flange portions, and outer cylindrical flanges at least partially overlying the inner flange portions and spaced radially therefrom by said webs, an annular rim pressed over each of said outer flanges to a position where the axial inner end thereof is adjacent to but does not overlie the radial projection of the associated radial web, and annular ring welds securing said axial inner ends of said rims to said outer flanges of said ring members whereby said webs are exposed radially intermediate said rims, said hub having a reduced portion intermediate said webs to provide radial shoulders in substantial alinement with said webs.

CHARLES H. KING.